March 17, 1970  C. W. HILTON ET AL  3,501,257
HEATER FOR AUTOMOBILE COOLING SYSTEM
Filed Jan. 22, 1968  2 Sheets-Sheet 1
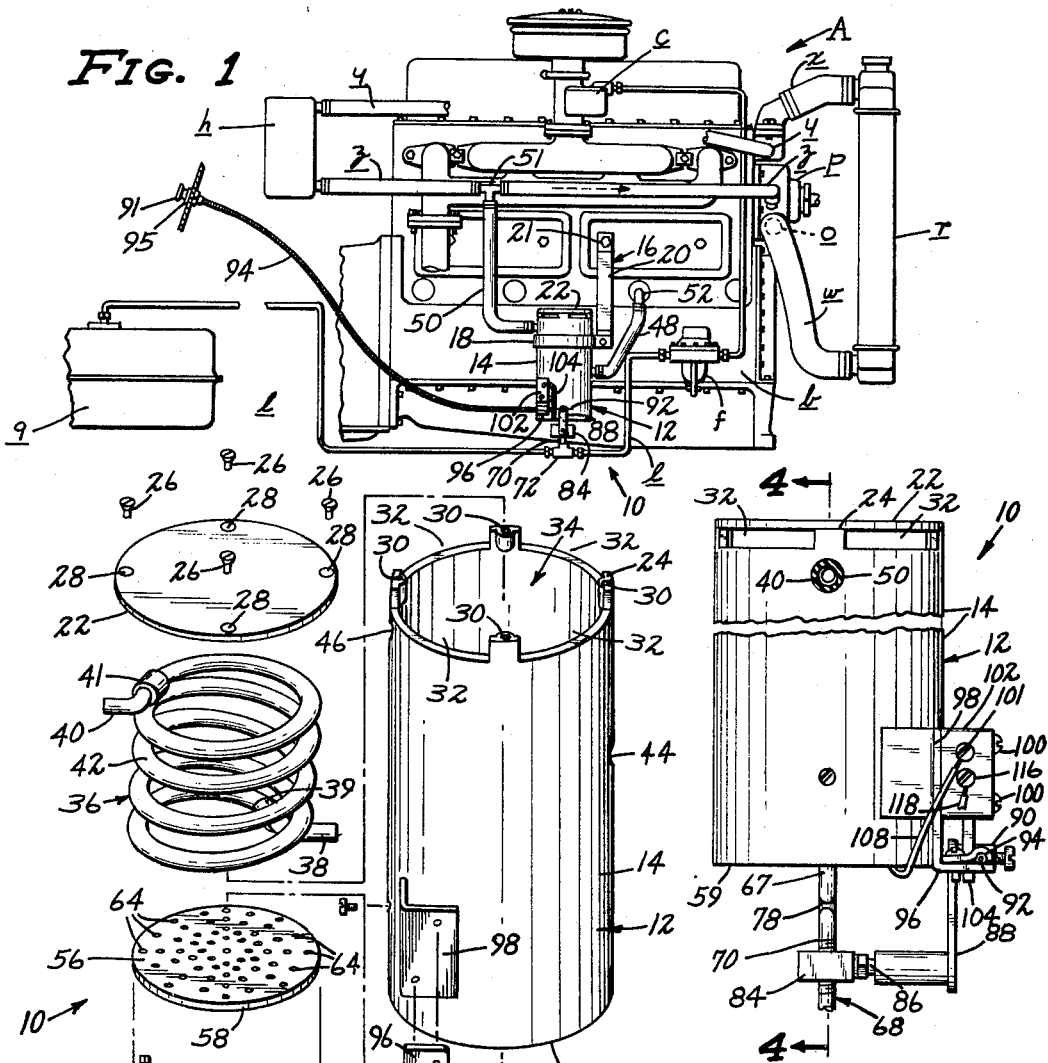
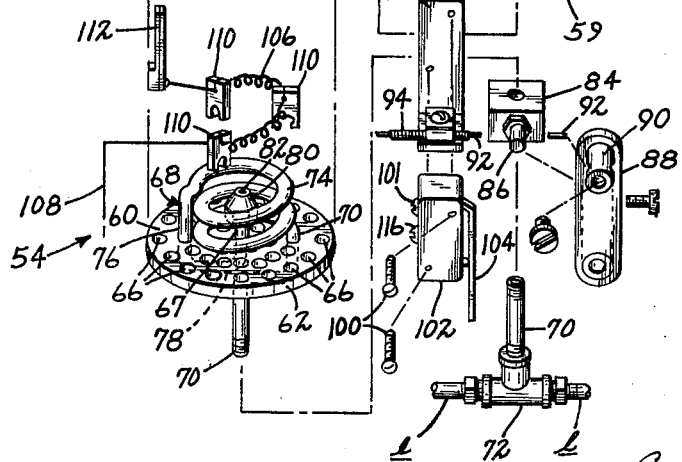
INVENTORS.
CHESTER W. HILTON
WALTER E. HEBERT
BY
Carlsen, Carlsen, Sturm & Wicks
ATTORNEYS March 17, 1970  C. W. HILTON ET AL  3,501,257
HEATER FOR AUTOMOBILE COOLING SYSTEM
Filed Jan. 22, 1968  2 Sheets-Sheet 2
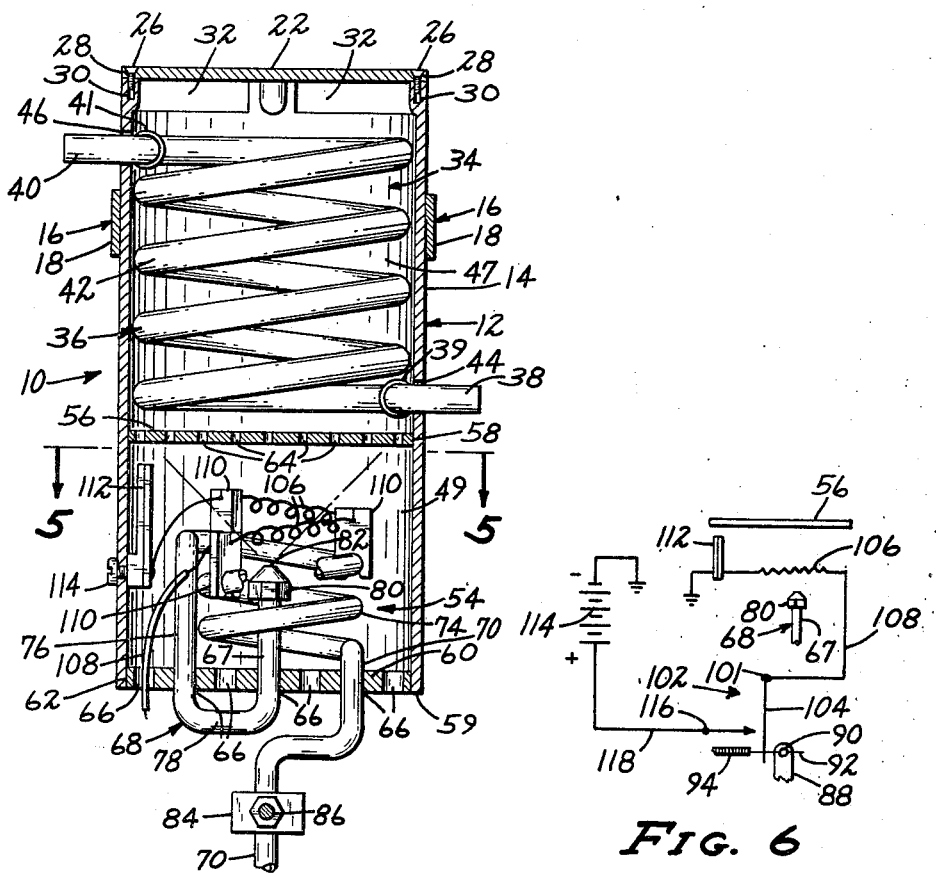
FIG. 4
FIG. 6
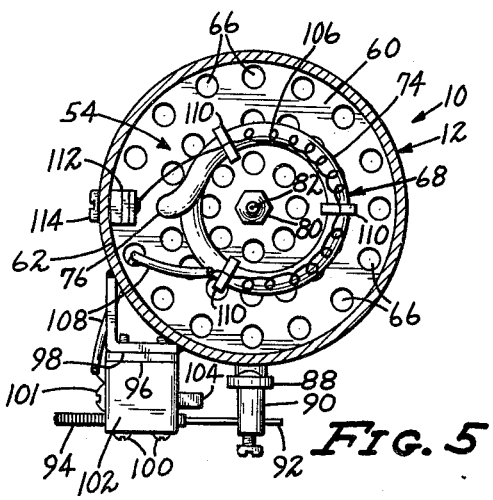
FIG. 5
INVENTORS.
CHESTER W. HILTON
WALTER E. HEBERT
BY
Carlsen, Carlsen, Sturm & Nicks
ATTORNEYS United States Patent Office 3,501,257
Patented Mar. 17, 1970

3,501,257
HEATER FOR AUTOMOBILE COOLING SYSTEM
Chester W. Hilton and Walter E. Hebert, both of 1525 Cloquet Ave., Cloquet, Minn. 55720
Filed Jan. 22, 1968, Ser. No. 699,657
Int. Cl. F23d *13/14, 11/44;* F24h *1/00*
U.S. Cl. 431—347                                                   4 Claims

ABSTRACT OF THE DISCLOSURE

An auxiliary heater for liquid cooled internal combustion engines, or the like, having a housing, the upper end of which is provided with a cap, a liquid conduit, having a portion thereof disposed within the housing and opposite ends connected to the cooling system of the internal combustion engine, a perforate plate in the housing adjacent the liquid conduit dividing the housing into an upper heating chamber and a lower mixing and combustion chamber, the plate being composed of a catalytic agent, a fuel supply conduit supplying fuel to a vaporizer below and adjacent the plate and heating means in the mixing and combustion chamber for initially igniting fuel from the fuel vaporizer and for heating the vaporizer and the catalyst plate to reach an operating temperature to burn the fuel and means for terminating the igniting means when the catalyst plate has reached an operating temperature.

BACKGROUND

In northern climates extreme difficulty in starting internal combustion engines often occurs when the ambient temperature of the surrounding atmosphere drops to its lower ranges. This is true particularly when such engines are inoperative for an extended period of time. Also such cold weather starting results in extreme wear of the moving parts of the engine since the lubricant thereof congeals in such weather to cause a lack of lubrication during such period of starting and immediately thereafter.

Various prior art devices have been produced to alleviate the above problems. Examples of such devices are "tank heaters," which are adapted to heat the cooling liquid of an engine, and "dip stick heaters," which are adapted to directly heat the crankcase oil of an engine with electrical power from a source independent of the automobile. Also such devices, while they may adequately maintain the temperature of the engine at a suitable degree to assure easy starting, are somewhat expensive to operate over extended periods of time. Fuel operated devices have also been devised for heating the coolant of the cooling system of an automobile.

SUMMARY OF THE INVENTION

To alleviate the above problems there has been provided an auxiliary heater interposed in the liquid cooling system of an internal combustion engine which utilizes a plate formed from a catalytic agent, a fuel supply line connected to the fuel supply of the engine and located below the plate and means for initially igniting the fuel mixture, to bring the catalyst plate to an operating temperature, which derives its power supply from the electrical power supply of the engine. Thus an auxiliary heating device is provided which has all the advantages of prior art devices and which additionally requires no additional fuel or power supply independent of that of the engine upon which it is mounted, and which requires no additional equipment independent of that of a vehicle associated with the engine to start and maintain operation of the auxiliary heater. Further, starting and maintaining catalytic action of the auxiliary heater, over extended periods of time, requires but a minimum of electrical power and fuel respectively and is thus inexpensive to operate.

It is therefore a principal object of the invention to provide a device of the class described which may be positively and easily operated without the need of power or fuel supplies independent of the vehicle upon which the device is mounted.

It is a further object of the invention to provide a device of the class described which requires no additional equipment independent of the vehicle upon which it is mounted to start and maintain operation.

It is a still further object of our invention to provide a device of the class described which is substantial and durable in construction, foolproof in operation, and relatively inexpensive to manufacture and operate.

These and other more detailed and specific objects will be disclosed in the course of the following specification, reference being had to the accompanying drawings, in which:

FIG. 1 is a diagrammatic view of an internal combustion engine and parts associated therewith showing an auxiliary heater constructed and installed in accordance with the present invention mounted thereon.

FIG. 2 is a view in exploded perspective of the auxiliary heater of FIG. 1.

FIG. 3 is an enlarged view in side elevation of the auxiliary heater of FIG. 1 as seen from left to right thereof, portions thereof being broken away.

FIG. 4 is an enlarged view in axial section as seen from the line 4—4 of FIG. 3.

FIG. 5 is a transverse horizontal section as seen from the line 5—5 of FIG. 4.

FIG. 6 is a schematic view of an electrical circuit utilized in the present embodiment.

FIG. 1 of the drawings diagrammatically illustrates an internal combustion engine A. Engine A includes a block *b* which forms a water jacket for cooling purposes, a carburetor *c*, and a fuel pump *f* for supplying fuel from a gas tank *g* to carburetor *c* through fuel lines *l*. Also included is a water pump *p* having an outlet (not shown) but which communicates with the water jacket of block *b* and an inlet *o* connected to a cooling radiator *r* by means of a hose *w*. Liquid passing through pump *p* and block *b* is returned to radiator *r* by hose *x*. A heater *h*, normally used to heat the interior of a vehicle (not shown), is connected to the cooling system of engine A by means of hoses *y, z*.

Many people living in northern climates are acutely aware of the problem of cold weather starting of internal combustion engines, such as A, particularly after prolonged periods of engine inactivity. To overcome the above problem there is provided an auxiliary heater, indicated generally by the numeral 10. Heater 10 includes a housing 12 which, in the embodiment shown, takes the form of a tubular cylinder having a lateral wall structure 14. A bracket 16 including a portion 18 encircling the housing 12 and a strap 20 secured at one end to the portion 18 and at its other end to block *b* of engine A, as at 21, supports housing 12 in a generally vertical position adjacent the lower portion of engine A. Housing 12 further includes a cap or cover 22 secured to the upper edge 24 of side wall 14 by means of screws or the like 26. Screws 26 extend through openings 28 in cover 22 and have threaded engagement with thread equipped openings 30 formed in the upper edge 24 of side wall 14. Side wall 14 is also cut away between the openings 30 to provide vents 32 for a reason which will be explained hereinafter.

With the cover 22 in place on the upper edges 24 of side wall 14 a chamber 34 is formed by housing 12 for the reception of a heat exchanger member in the form of the coiled fluid conduit 36. Conduit 36 includes an inlet end 38, and an outlet end 40 which are connected by a helically coiled portion 42. The inlet end 38 and outlet end 40 are connected to the conduit 36 by connectors 39 and 41, respectively. As shown particularly in FIG. 4 helically coiled portion 42 is positioned in the upper end of chamber 34 adjacent cover 22 with the inlet and outlet ends 38 and 40, respectively, extending to the exterior of housing 12 through openings 44 and 46, respectively, formed in wall structure 14. Connection of fluid conduit 36 to the cooling system of engine A is accomplished by means of a pair of flexible hoses 48, 50. Hose 48 is connected at one end to inlet end 38 of conduit 36 and at its other end to the drain 52 of block $b$ while hose 50 is connected at one end to outlet end 40 of conduit 36 and at its other end to hose $z$ of heater $h$, as at 51. Thus, a path of travel for liquid from block $b$, through housing 12, and back to block $b$ has been provided.

For the purpose of heating a fluid contained in conduit 36 and for maintaining fluid passing therethrough from block $b$ at a temperature above that of the ambient temperature of the surrounding atmosphere, there is provided a burner indicated generally by the numeral 54. Burner 54 is positioned generally in the lower end of chamber 34 and includes a first plate 56. Partition plate 56 extends transversely of the longitudinal axis of chamber 34 directly below coiled portion 42 of conduit 36 and is maintained in position by frictional engagement of the peripheral edge 58 thereof with wall 14 of housing 12. The plate or partition 56 divides the housing into an upper heating chamber 47 and a lower mixing and combustion chamber 49.

Plate 56 is provided to act as a catalytic agent and is formed from a material which is adaptable to catalytic action. Some examples of such material are brass, bronze, platinum, nickel and steel filings to name a few. In the present embodiment bronze is prefered primarily for reasons of availability and cost. Extending transversely of the longitudinal axis of chamber 34 adjacent the lower edge 59 of housing 12 is a second and lower plate 60. Plate 60 like plate 56 is frictionally held in place by engagement of the peripheral edge 62 thereof with wall 14. Each of the plates 56 and 60, respectively, are formed with a plurality of openings 64 and 66, respectively, therethrough to permit the flow of air into chamber 49 and the flow of products of combustion out through vent openings 32.

Extending into chamber 34 through an opening 66 in plate 60 and terminating in an outlet nozzle end portion 67 positioned generally between plate 56 and 60 is a fuel supply line 68. Fuel supply line 68 further includes an inlet end 70 which is connected by means of a T-connection 72 to the fuel supply line $l$ intermediate the fuel pump $f$ and gas tank $g$. From the T-connection 72 line 68 extends through an opening 66 in plate 60 into lower mixing and combustion chamber 49 and thereafter is formed into a helically coiled portion 74 which serves as a vaporizer. The final or upper convolution of coiled portion 74 is positioned above the level of outlet end 67. Fuel line 68 further includes a portion 76 which extends downwardly from the upper convolution of coiled portion 74 and passes through a second opening 66 in plate 60. Thereafter line 68 is bent, as at 78, to again extend upwardly through a central opening 66 in plate 60 to form the outlet nozzle portion 67. Outlet end portion 67 of fuel supply line 68 has secured to the upper end thereof a nozzle 80 provided with a restricted orifice 82. Fuel is vaporized in the upper end of coil 74 due to the heat upon the same.

Nozzle 80 is of a type to atomize fuel passing therethrough in an inverted cone-shaped pattern. Thus, a major portion of catalyst plate 56 is assured of a supply of atomized fuel mixture during operation of heater 10. Also, orifice 82 is of a size to meter the correct amount of fuel to maintain constant catalytic action of plate 56 to sufficiently heat coiled portion 42 during such operation. It will be here noted that openings 64 and 66 in plates 56 and 60, respectively, and vent openings 32 adjacent cover 22 permit the flow of atmospheric air into housing 12 for the purpose of supplying oxygen for burning of the atomized fuel and catalytic action of plate 56 and circulation of the products of combustion over coiled portion 42 of conduit 36. Interposed in fuel supply line 68, in underlying relationship to plate 60 and housing 12, is a shut-off valve 84. Valve 84 includes a rotary valve element 86 extending therefrom and to which is attached a crank arm 88. Arm 88 extends upwardly from valve element 86 and has secured thereto, as at 90, a control wire 92. Control wire 92 extends from arm 88, through a tubular guide 94, and is connected at its other end to a control knob 91. The guide 94 adjacent the knob 91 is connected to the vehicle as at 95. Guide 94 is removably secured at the end adjacent crank arm 88 to an L-shaped bracket 96 which is secured to a shoulder 98, formed on the outer surface of wall 14, by means of bolts 100. Wire 92 together with guide 94 acts to provide means for controlling on-off movements of valve 84.

Also secured to shoulder 98 by means of bolts 100 is a normally open microswitch 102. Switch 102 includes a switch arm 104 which depends therefrom to a point wherein it is in the path of travel of arm 88. Switch 102 forms part of a circuit, shown schematically in FIG. 6, for initially igniting fuel from nozzle 80. The circuit further includes heating means 106 formed from Nichrome resistance wire connected to one side 101 of switch 102 by a lead 108. The heating means 106 is in the form of a helix whose axis is arcuate and is disposed above the last or upper convolution of coiled portion 74 and supported by means of insulator brackets, or the like 110 which position heating means 106 in the path of the fuel mixture. The other end of heating means 106 is connected to one side of a normally closed thermoresponsive bimetal switch 112. The other side of switch 112 is mounted on side wall 14 of housing 12 and consequently is grounded. Bimetal switch 112 is mounted in chamber 49 between plates 56 and 60 and is responsive to heat generated by catalyst plate 56 and fuel to break the circuit to heating means 106 when plate 56 reaches the correct operating temperature.

One terminal of a battery 114 is grounded and the other terminal thereof is connected to the electrical system (not shown) of the vehicle upon which it is mounted. The other side 116 of switch 102 is connected to a hot lead of the electrical system of the vehicle or directly to the other terminal of battery 114 by a lead 118, thus completing the circuit connecting the heating means 106 to a source of electrical energy such as battery 114.

OPERATION

The auxiliary heater 10 operates as follows. An operator grasps the knob 91 and pulls the same which causes crank arm 88 to move counterclockwise with respect to FIG. 1. As valve 84 opens raw gas, under the action of gravity, flows from tank $g$, through line $l$, T-connection 72, valve 84 and fuel supply line 68 to nozzle 80. When crank arm 88 moves to its "on" position, the free end thereof engages arm 104 of switch 102 to close the electrical circuit to the heating means 106 and ignites the mixture of gas spraying from nozzle 80 and air entering chamber 49 through openings 66 in plate 54.

Heat generated by the burning of the fuel in chamber 49 brings the catalyst plate 56 up to its operating temperature and vaporizes raw gas in vaporizer 74 connected to supply line 68. As the plate 56 reaches its operating temperature bimetal switch 112 opens, thus breaking the circuit to heating means 106. Thereafter vaporized gas from the nozzle 80 is directed against plate 56 to maintain the catalytic action thereof which burns the fuel until valve 84 is again closed.

Heat is generated by burning raw fuel in mixing and combustion chamber 49 and thereafter the catalyst plate 56 causes a flow of air through openings 66 of plate 60 and fuel mixture through, openings 64 of plate 56, over coiled portion 42 of fluid conduit 36 and thence out vent openings 32 formed in housing 12. This assures a supply of fuel mixture for the catalytic plate 56 as well as a transfer of heat generated by plate 56 to the fluid contained within coiled portion 42 of conduit 36. By natural circulation heated fluid in portion 42 flows upwardly through hose 50, heater hose z (in the direction of dotted arrow) to block b through pump p. At the same time cooler water enters portion 42 of coil 36 from block b through hose 48. Continued operation of heater 10 obviously causes a continuous circulation of heated liquid through block b to maintain the temperature thereof above that of the surrounding atmosphere to provide for easy starting and instant lubrication during periods of extremely cold weather.

It will be seen that an auxiliary heater 10 has been provided which may be operated regardless of the location of the vehicle upon which it is mounted, since heater 10 does not depend on either a fuel or electrical power supply independent of the vehicle. It is further pointed out that heater 10 requires but a minimum power drain from battery 114 to start same and but a minimum of fuel to maintain the catalyst plate 56 in an operating condition to cause the burning of the fuel.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In combination with the pressurized fuel line of a motor vehicle a heater having:
    (a) a housing formed with a top, a bottom and a lateral wall structure and provided with
    (b) a perforate catalytic partition extending across said wall structure and dividing the interior of said case into
    (c) an upper vented heating chamber and a lower
    (d) mixing and combustion chamber,
    (e) air inlets in said mixing and combustion chamber,
    (f) a fuel nozzle in said mixing and combustion chamber directing a spray of liquid toward said partition,
    (g) a feed tube connected to said fuel line for supplying liquid fuel to said nozzle,
    (h) a heat actuated fuel vaporizer in said mixing and combustion chamber,
    (i) electric heating means disposed in said mixing and combustion chamber between said partition and vaporizer and in proximity to said vaporizer,
    (j) said heating means vaporizing the liquid in said vaporizer and
    (k) simultaneously heating said partition and
    (l) igniting the fuel mixture.

2. The combination of elements recited in claim 1 in which the electric heating means overlies a portion of the vaporizer and conforms in configuration thereto.

3. The combination of elements recited in claim 1 in which:
    (a) the vaporizer is in the form of a helix arranged with its axis vertical and
    (b) the nozzle is at the upper end of the helix and coaxial with the axis of the vaporizer.

4. The combination of elements recited in claim 3 in which:
    (a) the heating means is constructed in the form of a helix with
    (b) its axis arcuate and conforming with and overlying the upper convolution of the vaporizer.

References Cited

UNITED STATES PATENTS

| | | | |
|---|---|---|---|
| 613,685 | 11/1898 | Kitson | 431—208 |
| 1,095,509 | 5/1914 | McCracken | 431—242 |
| 1,639,114 | 8/1927 | Smith | 126—92 |
| 2,097,771 | 11/1937 | Nelson | 431—242 |
| 2,362,972 | 11/1944 | Brownback | 431—170 X |
| 2,551,823 | 5/1951 | Buttner et al. | 237—28 |
| 2,552,845 | 5/1951 | Crosby | 431—328 |
| 2,775,294 | 12/1956 | Schwank | 431—328 |
| 2,949,106 | 8/1960 | Sunday. | |
| 3,118,490 | 1/1964 | Page-Roberts et al. | 431—208 X |
| 3,418,979 | 12/1968 | Reichmann | 431—328 X |

FOREIGN PATENTS 420,835  12/1934  Great Britain.

FREDERICK L. MATTESON, Primary Examiner

R. A. DUA, Assistant Examiner

U.S. Cl. X.R.

126—350; 431—208, 326